(12) United States Patent
Van Loen

(10) Patent No.: US 6,769,495 B1
(45) Date of Patent: Aug. 3, 2004

(54) DEVICE FOR THE HARVESTING OF CULTIVATED TURFS

(75) Inventor: Leonardus Lambertus Van Loen, Haagland (NL)

(73) Assignee: Van Loen Techniek, B.V. (NL)

( * ) Notice: Subject to any disclaimer, the term of this patent is extended or adjusted under 35 U.S.C. 154(b) by 70 days.

(21) Appl. No.: 10/031,060

(22) PCT Filed: Jul. 17, 2000

(86) PCT No.: PCT/NL00/00500

§ 371 (c)(1), (2), (4) Date: Apr. 29, 2002

(87) PCT Pub. No.: WO01/05212

PCT Pub. Date: Jan. 25, 2001

(30) Foreign Application Priority Data

Jul. 16, 1999 (NL) .............................. 1012614

(51) Int. Cl.[7] .............................................. A01B 45/04
(52) U.S. Cl. ....................................................... 172/19
(58) Field of Search ..................................... 172/19, 20

(56) References Cited

U.S. PATENT DOCUMENTS

| | | | | | |
|---|---|---|---|---|---|
| 3,807,505 | A | * | 4/1974 | Nunes | .......................... 172/20 |
| 3,963,364 | A | * | 6/1976 | Lemelson | ...................... 408/8 |
| 4,892,152 | A | * | 1/1990 | van Vuuren | .................. 172/20 |
| 4,966,239 | A | * | 10/1990 | Hutchison | ...................... 172/20 |
| 5,245,760 | A | * | 9/1993 | Smart et al. | ................... 33/735 |
| 5,571,252 | A | * | 11/1996 | Worrel et al. | .................. 172/20 |
| 5,626,195 | A | * | 5/1997 | Dover | .......................... 172/19 |
| 6,244,354 | B1 | * | 6/2001 | Van Vuuren | .................. 172/19 |
| 6,263,773 | B1 | * | 7/2001 | McAdoo et al. | ............. 83/75.5 |
| 6,364,027 | B1 | * | 4/2002 | Tvetene et al. | ................. 172/1 |
| 6,450,707 | B1 | * | 9/2002 | Spencer et al. | ............. 396/445 |

* cited by examiner

Primary Examiner—Thomas B. Will
Assistant Examiner—Nathan Mammen
(74) Attorney, Agent, or Firm—McDonnell Boehnen Hulbert & Berghoff

(57) ABSTRACT

A device for the harvesting of cultivated turfs (3) comprising a mobile chassis (1) with a first kiffe (21) that is capable of cutting a cultivated turf from a field, and via a second knife (22) is capable of chopping the cultivated turf in a direction that is transverse to the direction of travel. The second knife is equipped with electronically controlled mechanisms (41, 42, 45) that allow the second knife to work into the cultivated turf when a desired turf length bas been reached. An electronic sensor (80, 81, 82) is installed near to a conveyor track (60) for the cultivated turf and is at least capable of recording a size for a length of passing cultivated turf and producing this as an electronic signal. The sensor is linked by electronic means to the electronically controlled mechanisms for the second knife in order to release the second knife upon reaching a predetermined cultivated turf length.

14 Claims, 4 Drawing Sheets

DEVICE FOR THE HARVESTING OF CULTIVATED TURFS

BRIEF DESCRIPTION

This invention relates to a sod harvesting device, comprising a mobile chassis with a first knife that is capable of cutting a sod free from a field, and a second knife that is capable of chopping the sod in a direction that is transverse to the direction of travel, whereby the second knife is equipped with electronically controlled mechanisms that allow the second knife to work into the sod when a desired sod length has been reached, and where transport mechanisms are present near to the first knife to collect the cut away sod and to carry it away.

Such a device is mainly used for the harvesting of cultivated turfs. A known device for the harvesting of grass turfs contains a chassis that is possibly self-propelled and contains a first knife on the front side, when viewed in the direction of travel, for cutting away a sod of a certain width and thickness from the field. The knife thus grasps at the desired thickness below ground level, while a drum rolls over the field next to the knife in order to enclose the sod between the knife and the drum so that a uniform thickness is obtained. Moreover, the device contains a second knife that is activated after the desired length of grass turf has been cut away, in order to chop the sod transverse to the longitudinal direction. The sod that has been harvested to the desired length is guided behind the first knife to a means of transport in the form of a conveyor belt that carries it away. In the meantime, the next grass turf is already cut away.

The known device operates automatically to a certain extent since the second knife rests under considerable spring tension on a cam disc and is always released when this cam disc turns, where the cam disc is linked to the drum via a chain drive. After an exact predetermined number of revolutions of the drum, the second knife is activated and the harvested sod is chopped. A drawback of this is that the transition to a different sod length requires relatively major adjustment of the device since in order to achieve this, a different gear ratio must be obtained in the chain drive. In practice, this means that the existing gear wheels must be removed in order to make room for other gear wheels. This not only takes time and results in the device being out of service, but is above all relatively inaccurate since only lengths that match a specific gear ratio can be used. In practice, it is often desirable to adjust the length of the grass turf rather accurately in order to ensure that the diameter of a roll of turf is virtually constant. If, during the harvesting, due to the subsoil, a different depth is used for the first knife, this means that a different length must also be chosen in order to obtain the same diameter. This cannot, or is almost impossible to achieve using the known device.

Moreover, the known device is rather inaccurate since the drum often slips due to the resistance that the drum encounters in the chain drive and the limited friction on the field. This results in the harvested sod having a greater length than was intended. This is in any event what happens to the sod that is first to be harvested after the device starts operating. The distance between the drum and the second knife will inevitably cause this sod harvested over this distance to be too long, with this having to be manually corrected and resulting in rejection of the relevant sod part.

A somewhat better construction is revealed by the sod harvesting apparatus disclosed in U.S. Pat. No. 4,966,239. Also this apparatus comprises a harvesting knife in the front section of the machine capable of cutting loose a sod from the field together with a cutting knife which is capable of cutting the sod in the traverse direction over it's entire thickness once the desired length is obtained. Different from the prior art device described hereinbefore, the apparatus known from this US patent comprises electronic means for determining the length of sod and an electronic signal is given to the cutting knife in order to cut the sod . These electronic means consist of a inductive, eddy current pick up which counts the number of passing teeth on a gear in the harvesting transmission and sends pulses to an electronic pre-determining counter. The counter sends a signal to actuation means of the cutting life once a programmed number of pulses is exceeded, which causes the sod being cut. Although this allows for more precise, finer and especially much more easily finer setting of the desired length compared to the previously described prior art device, also this device does not take into account any irregularities which may arise in the harvested product, such as interruptions and temporary variations in the length of the product due to stretching and crimping. In stead just the number of revolutions of the gear wheel is taken as a basis for activating the cutting knife.

This invention is intended, in a device of the type mentioned in the introduction, to ensure that these disadvantages are barely apparent, and in particular, to ensure that a fine adjustment is available for the harvested sod length.

SUMMARY OF THE INVENTION

In order to attain this objective, according to the invention, a device of the type mentioned in the introduction, is characterised in that an electronic sensor installed near to a conveyor track for the sod is at least capable of recording a size for a length of passing sod and producing this as an electronic signal, and that the sensor is linked by electronic means to the electronically controlled mechanisms for the second knife in order to release the second knife upon reaching a predetermined sod length. Thus the invention provides a sensor that directly or indirectly measures the length of the passing sod, unlike the known device where the rotation of the drum essentially represents a displacement of the device as a whole. Thus, in the device according to the invention, the sod that is first to be harvested will be processed in the same way as successive sod s. Since measuring takes place after the harvesting, instead of before as is the case for the known device, the device according to the invention is thus much less susceptible to stretching and shrinking of the harvested sod s that can result from a difference in speed between the discharge rates of the transport mechanisms and the driving speed of the device as a whole. In accordance with the invention, the length of the grass turf can be recorded as the grass turf is ultimately delivered. Since the invention is based on an electronic sensor and the same transmission to the second knife, measuring can take place virtually without any friction, and the sod can be adjusted electronically to any desired length, without having to take the device out of service to do this.

A preferred embodiment of the device according to the invention is characterised in that the sensor is linked to the electronically controlled mechanisms via the medium of a central processing unit. The central processing unit enables other relevant parameters to be taken into account, such as the actual thickness of the sod, so that an optimal end product can be obtained.

In a particular embodiment, the device according to the invention is characterised in that the electronic sensor contains a measuring wheel to rest on a passing sod and to be driven by it, and that a sensor is linked to the measuring wheel that records a rotation of the measuring wheel and produces an electronic signal. In this case, the harvested sod is directly measured in order to obtain an extremely accurate measuring result. This measuring result is sent to the central processing unit for further processing.

A preferred embodiment of the device is characterised in that the sensor is capable of recording the direction of rotation of the measuring wheel. Since the sensor is capable of not only sensing a rotation, but also the direction of rotation of the measuring wheel, the travelling forwards and backwards and any shocks in the transportation of the sod can be taken into account, so that the final length of the sod is not altered. A particular embodiment, the device according to the invention is, in this respect, characterised in that the sensor contains an incremental pulse generator.

Another preferred embodiment of the device according to the invention is characterised in that an electronic means of detection is used to record the presence of a sod in the conveyor track and to produce this as an electronic signal. This results in not only the length of the harvested sod being measured, but the presence of the sod in the conveyor track also being detected, and this is produced as an electronic signal. In particular, the length of the harvested sod is determined, indirectly, if not on the sod itself, thus allowing corrections to be made for the cases or periods when a sod is not in the conveyor track. This is in particular relevant for a length correction for the first sod to be harvested, and for a correction for gaps between consecutive sod s resulting from the occurrence of stretching and shrinking as previously described.

In a particular embodiment, the device according to the invention is characterised in the aforementioned context in that the sensor is essentially commonly suspended in a direction transverse to the conveyor track for the sod in order to be raised from a point of departure when a sod passes, and in that the means of detection is linked to a suspension attached to a sensor. This embodiment enables the presence or non-presence of a sod to be recorded in a relatively simple yet not less efficient manner. As soon as the sod is no longer present, the suspension will return to the point of departure and touch the means of detection that produces this as an electronic signal. In another embodiment, the device according to the invention is characterised in that the means of detection contains an electric switch that is capable of working together with the suspension attached to the sensor, at least when leaving its point of departure.

Because sod s are often rolled up after they have been harvested, with this roll preferably having a constant diameter, not only the length of the sod is important, but the thickness of the sod also plays a role. With this in mind, another embodiment of the device according to the invention is characterised in that means are installed next to a conveyor track for the sod in order to determine the thickness of a harvested sod and to produce this as an electronic value.

Another embodiment of the device according to the invention is characterised in that the sensor is commonly suspended in a direction transverse to the conveyor track and in that the means for determining the thickness of the sod contains a raise detector that is capable of recording an amount of raising of the sensor and producing this as an electronic value. The amount of raising provides a guideline for the actual thickness of the sod and can, as such, produce an electronic value, for example to a central processing unit Thus thickness variations in the sod s can be taken into account completely automatically, so that a constant diameter is attained when a sod is rolled up. Another particular embodiment of the device according to the invention is characterised in that the raise detector contains a slide resistor that is linked to the sensor. The raising of the measuring wheel thus results in a corresponding sliding in or sliding out of the slide resistor and the associated change in resistance that can be processed electronically.

Another embodiment of the device according to the invention is characterised in that the first knife is adjustable and is equipped with a means of adjustment that can be controlled by a central processing unit. Thus not only the length of the sod is controlled, but electronic control of the thickness is also possible with an electronic link between both in order to ensure that the final diameter of the rolled up product is constant. Thus, an extremely user-friendly system is obtained where, in practice, only one operator is required.

The means of adjustment can be implemented in several ways, for example, via the medium of a hydraulically or pneumatically controlled pressure cylinder. An embodiment of the device according to the invention that has been proven in practice is, in this respect, characterised in that the means of adjustment contains an electronically controlled actuator that is linked to the first knife. The actuator can for example be a spindle that is driven by an electrical stepper motor or an adjustment cylinder that is possibly hydraulic. In both cases, the first knife can be accurately adjusted to the desired depth.

The electronic control mechanism for the second knife can also be implemented in various ways. Another particular embodiment of the device according to the invention is also characterised in that the electronically controlled mechanisms for the second knife contains an electronic clutch that is incorporated in a transmission between a drive for the chassis and a cam disc on which the second knife rests under spring pressure. As soon as the clutch is activated, the cam disc will be driven and the second knife will be released so that the sod is chopped. This can for example be controlled by a central processing unit.

BRIEF DESCRIPTION OF THE FIGURES

The invention will be further explained based on an example of an embodiment and an associated illustration. The illustration shows.

The figures are purely schematic and are not drawn to the same scale. In particular, for the sake of clarity, some of the dimensions have been greatly exaggerated. In the figures, the same reference number is used as far as possible for corresponding parts.

DETAILED DESCRIPTION OF THE INVENTION

Figure 1:
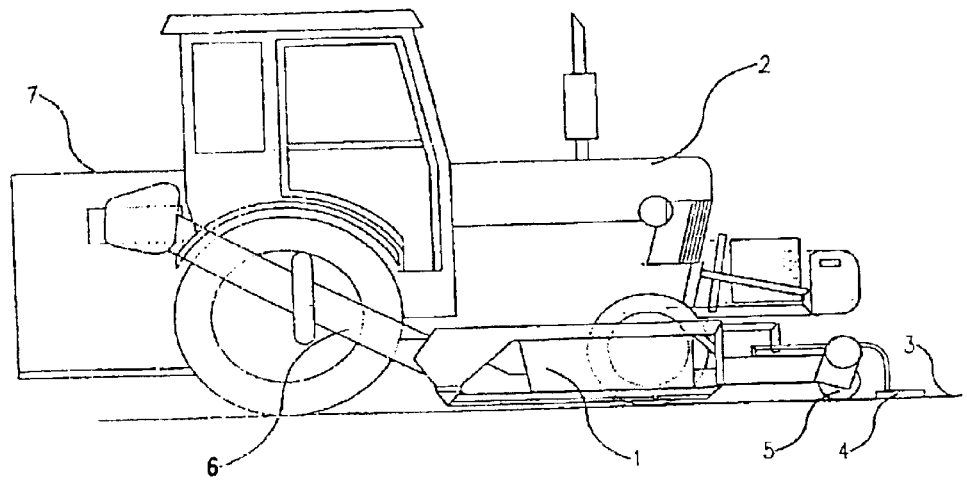
FIG. 1 a side view of an embodiment of the device according to the invention.

FIG. 1 shows a sod harvesting device in the form of a mobile chassis 1 that is connected to an existing tractor 2. As an alternative, the device can also be self-propelled, in which case the tractor and the device form a single integrated entity. The sod s to be harvested are in field 3. Leaves and other waste are removed from these sod s by means of a rotating roller brush 5. Moreover, the device has a side guide 4 that rests under spring tension against an edge of the surface and is linked to the steering device of the device. Thus the device is capable by itself of maintaining a course along the edge of the next track of sod s to be harvested, and the complete device can be entirely operated by only one operator. For the harvesting, the device 1 contains two knives that are incorporated within the plating of the device and this is shown in more detail in FIG. 2. The harvested sod s are carried away with the aid of a means of transport in the form of a conveyor belt 6 to a temporary storage location 7 where the sod s are unloaded. In practice, the sod s are rolled into rolls that have a more or less fixed diameter and stacked on a pallet at the unloading bay. When the pallet is completely full, it is removed from the device in order to be placed in the field or directly carried away.

Figure 2:
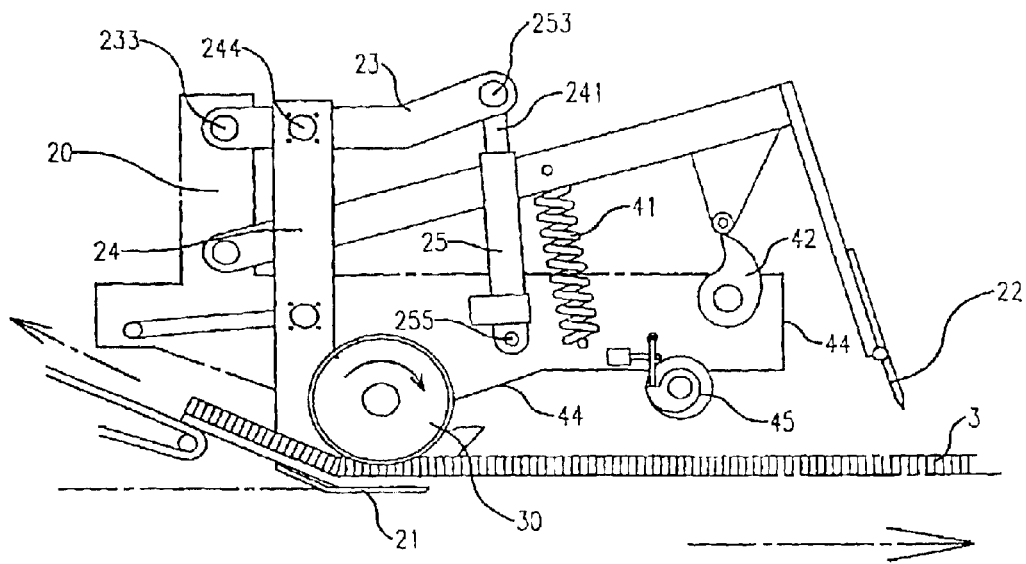
FIG. 2 a cross-sectional view through a first part of the device in FIG. 1.

The set of knives that is shown in cross-section in FIG. 2 contains a first knife 21 that grasps underneath the sod to be harvested 3 that will be referred to from here onwards as the harvesting knife. This knife 21 is adjustable and is equipped with all electronically controlled depth control mechanism that contains two operating rods 23, 24 and means of adjustment in the form of an actuator 25. The actuator 25 contains a hydraulic cylinder, but instead of an adjusting cylinder that is possibly hydraulic, an electrical spindle or another type of linear-operated medium can also be used. The actuator thus acts as a hinge around a pivot 253 on a first of two operating rods 23 that acts as a hinge around a pivot 233 and is connected with a part of a frame 20 of the device. The actuator 25 itself is also hinged on the other side of this rod 23 around a pivot 255 and connected to the frame. Transverse to the first operating position, a second of two operating rods 24 is hinged around a pivot 244 and connected to the first operating rod while this second operating rod supports the harvesting knife on its associated free end. Thus the harvesting knife 21 will move downwards if a piston rod 251 of the adjusting cylinder extends, and will be forced upwards if the piston rod 251 retracts. This allows the depth of the harvesting knife 21, and the subsequent thickness of the sod s 3 to be harvested, to be controlled relatively accurately by electrical means.

In order to prevent the sod from creeping upwards while it is being cut away by the harvesting knife on the underside, a relatively heavy drum 30 rolls over the field 3 beside the harvesting knife 21 so that the sod is enclosed between the drum 30 and the knife 21. A conveyor belt 6 is located behind the harvesting knife 21 for guiding the harvested sod before it is carried away to the unloading bay 7.

The device also has a second knife 22 for chopping the sod when it reaches the desired length. This knife 22 is capable of chopping transverse to the longitudinal direction of the sod and thus chopping in a single action. This knife, that will also be referred to from here onwards as the chopping knife, rests under considerable spring tension on a cam disc 42 by a spring 41 that is secured to a rotation axis 422. The cam disc 42 is linked to the drum via a chain drive 44 that is only schematically represented in the figure, with the medium of an electrically controlled clutch 45. The clutch 45 and the cam disc 42 are mutually adjusted so that the chopping knife 22 is always directly forced back to its highest position after the chopping of a sod, as shown in the figure. In this position, the clutch 45 disengages the drive 44 so that the chopping knife remains rigidly in this position until the clutch is activated and the cam disc is driven over this highest point. In that case, the spring tension of the spring 41 ensures that the chopping knife will separate the harvested sod almost instantaneously from the next sod.

Figure 3A:
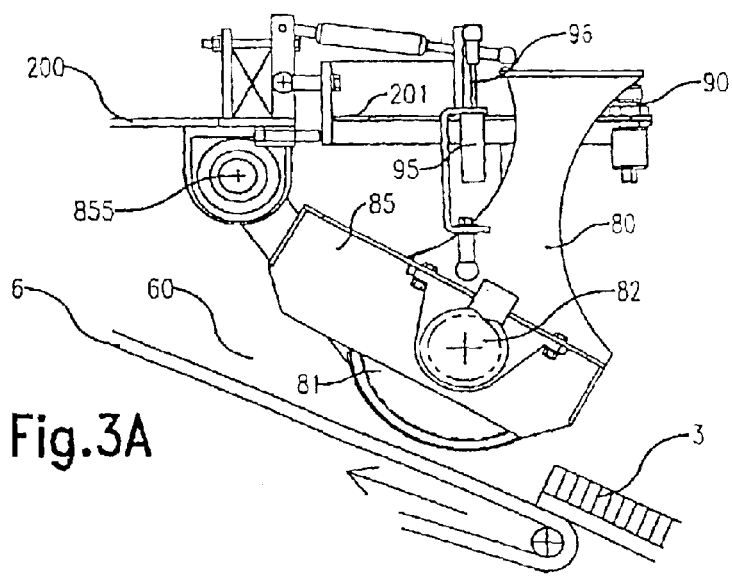
FIG. 3A a cross-sectional view through a second part of the device in FIG. 1 in a first position.
Figure 3B:
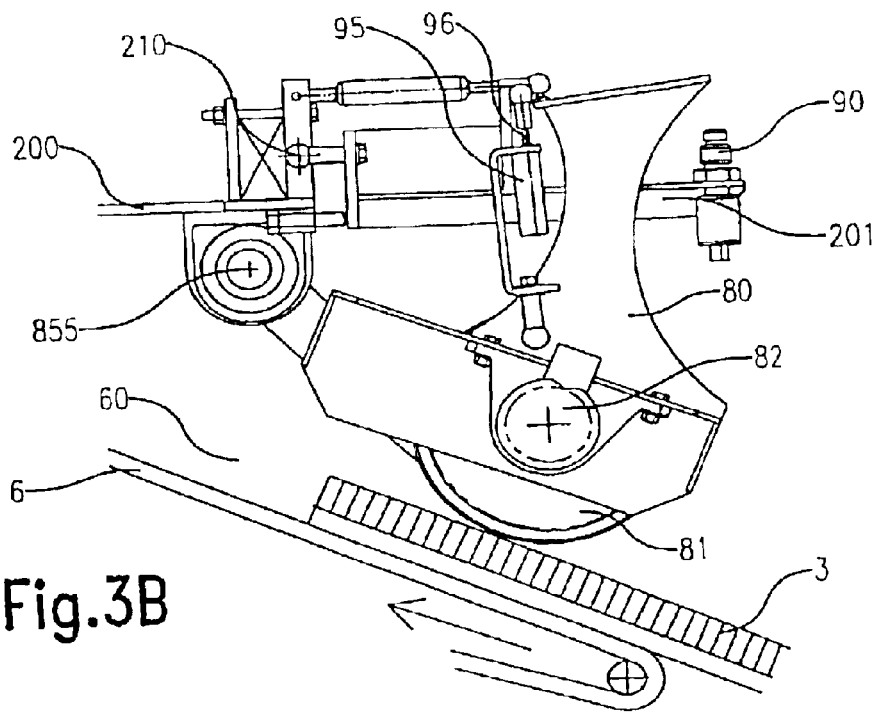
FIG. 3B a cross-sectional view through a second part of the device in FIG. 1 in a second position.

The device in this example is equipped with a filly automatic and accurately adjustable control for the length and thickness of the sod. This control incorporates a set of electronic sensors that are housed in an integrated unit that, as such, can be installed as a finished factory product or at a later date on a sod harvesting device. This unit is shown in detail in various stages in FIGS. 3A and 3B and first of all contains an electronic sensor 80 that is located near to a conveyor track 6 for receiving the sod, and is capable of recording the length of a passing sod 3 and producing this as an electronic value. In this case, this sensor 80 incorporates a measuring wheel 81 that is capable of resting on a passing sod 3 and being driven by it. For this, the measuring wheel 81 is incorporated in a common suspension 85 that is linked and hinged to a pivot 855 with a fixed part 200 of the chassis of the device. This suspension 85 rests under its own weight with the measuring wheel on a passing sod 3, as shown in FIG. 3B. This enables the measuring wheel 81 to be driven. A rotation sensor 82 in the form of an incremental pulse generator is linked to an end of an associated hub. This produces a series of pulses for each revolution of the measuring wheel. Each pulse represents a sod length $1=2\pi r/n$ where r is the radius of the measuring wheel and n is the number of pulses per rotation. In this case, a pulse generator is used that, in addition to detecting the rotation of the measuring wheel, also detects its direction of rotation, so that in the event of rotation in the opposite direction, a corresponding length is subtracted from the measuring result. Thus the length of a passing sod 3 is accurately derived from the number of pulses from the pulse generator. The pulse generator is linked by electronic means to a central processing unit 100 that in turn is linked to the electrical clutch 45. The central processing unit 100 incorporates an input means in the form of a numerical keyboard 101 and a checking window 102 that can be used to numerically set the desired sod length. When the desired length is reached, the central processing unit sends a signal to the clutch 45 that in turn re-engages the chain drive 44 to the cam disc 42 so that the chopping knife 22 is released and almost instantaneously chops the sod to the desired length. The processing unit also incorporates a manual switch 103 in the form of a pushbutton that enables the operator to operate the chopping knife 22 at any desired moment and to chop the sod 3. This is for example desirable if a visual inspection by the operator establishes that the quality of the sod is inferior, so harvesting of the good sod s can be resumed immediately after passing this part.

In order to prevent the sensor from continuing to count when a sod 3 is not present in the conveyor track 60, the unit contains an additional means of detection to detect whether or not a sod is present in the conveyor track 60. This means of detection incorporates an electrical switch 90 that is capable of operating in conjunction with the sensor 80. In the situation shown in FIG. 3A, where a sod is not present underneath the measuring wheel 81, the full weight of the sensor 80 rests on the switch 90 so that it is depressed. However, as soon as a sod passes underneath the measuring wheel 81 (see FIG. 3B), the sensor is raised from this point of departure and the switch is released. Thus the position of the switch provides an indication of whether or not a sod 3 is present in the conveyor track, with it being possible for this to be electronically detected, which can be supplied to the central processing unit 100 that is linked to the switch.

If the switch 90 is depressed, the central processing unit 100 will temporarily stop measuring the length, and will resume this task immediately after the switch has been released. Thus measuring errors resulting from interruptions between consecutive sod s, or from the first sod to be harvested, are prevented.

Moreover, the unit incorporates a means for measuring a thickness of a fieshly harvested sod 3 and to possibly feed this information back to the depth controller 25 for the harvesting knife 21. This means incorporates a raise detector that records the amount by which the sensor 80 is raised. The raise detector consists of a slide resistor 95, 96 that is located between the sensor 80 and the part 201 of the chassis and also contains the switch 90. The slide resistor consists of a housing 95 in which a sliding electrode slides over a wound resistance element. As the sensor is raised by a passing sod from the point of departure shown in FIG. 3A, this electrode 96 will move further into the housing so that the resistance decreases. A virtually linear relationship exists between the amount by which the sensor is raised and the resistance of the slide resistor, so that this resistance provides a relatively direct indication of the actual thickness of the sod. If the measured thickness deviates at any moment from a value programmed via the input means, then the central processing unit will send a signal to the actuator requesting it to compensate for the deviation so that fully automatic thickness control is possible.

Figure 3C:
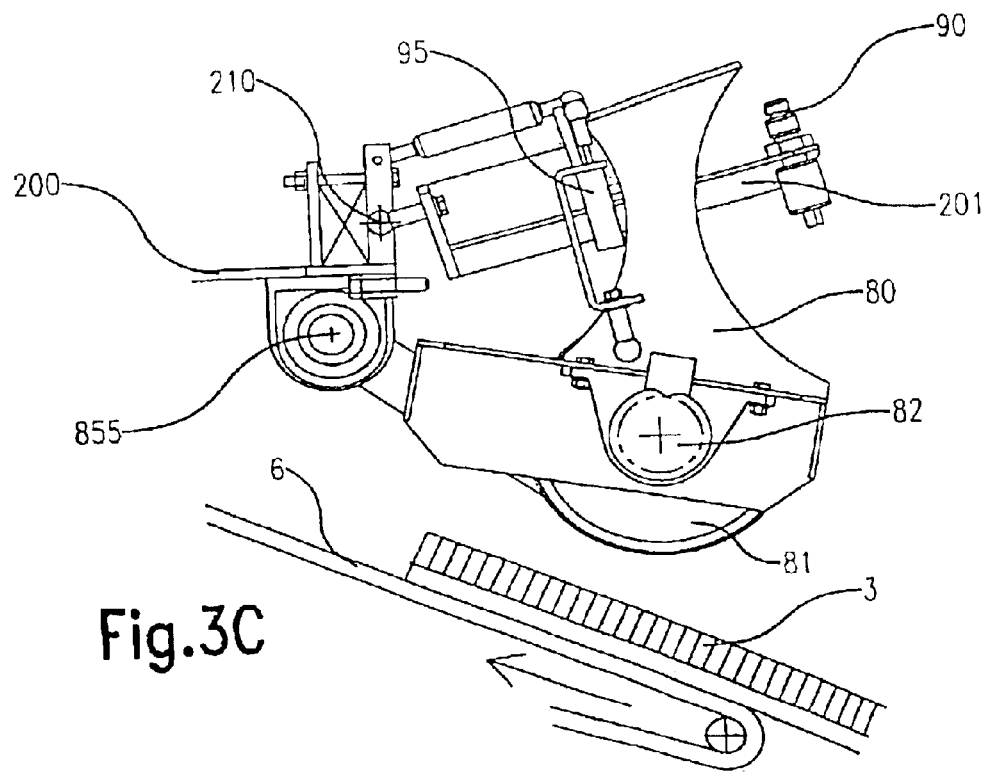
FIG. 3C a cross-sectional view through a second part of the device in FIG. 1 in a third position.
Figure 4:
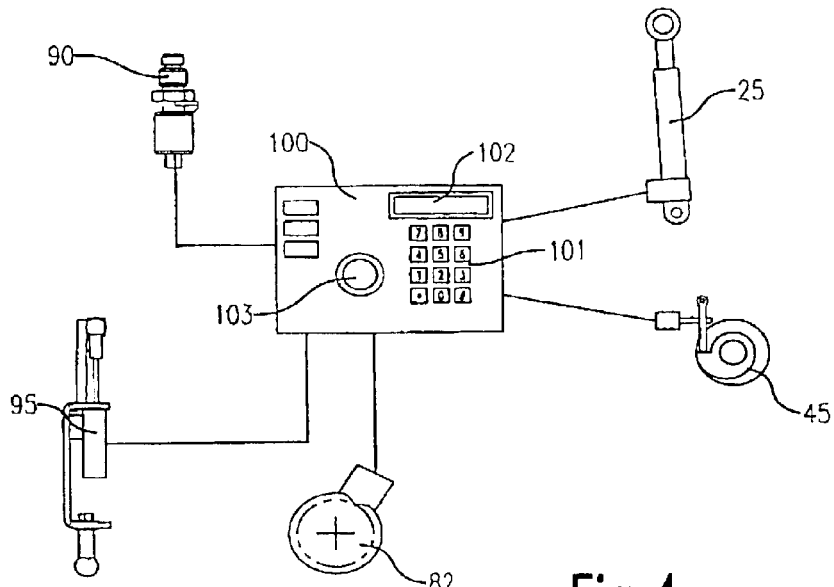
FIG. 4 a schematic representation of an electronic circuit for the device in FIG. 1.

In order to ensure that the relatively vulnerable resistance element 95 cannot become damaged if the sensor is raised further than the sliding electrode allows, the part of the chassis 201 against which the sliding electrode 96 rests is separately hinged around a pivot 210 connected to the chassis 200. A stop (not illustrated) is located between this part 201 and the sensor so that when the sliding electrode 96 reaches the end of its travel in the resistance housing 95, this part 201 is raised by the sensor 80 in order to prevent mechanical overloading of the slide resistor 95, 96. This situation is shown in FIG. 3C.

Figure 5:
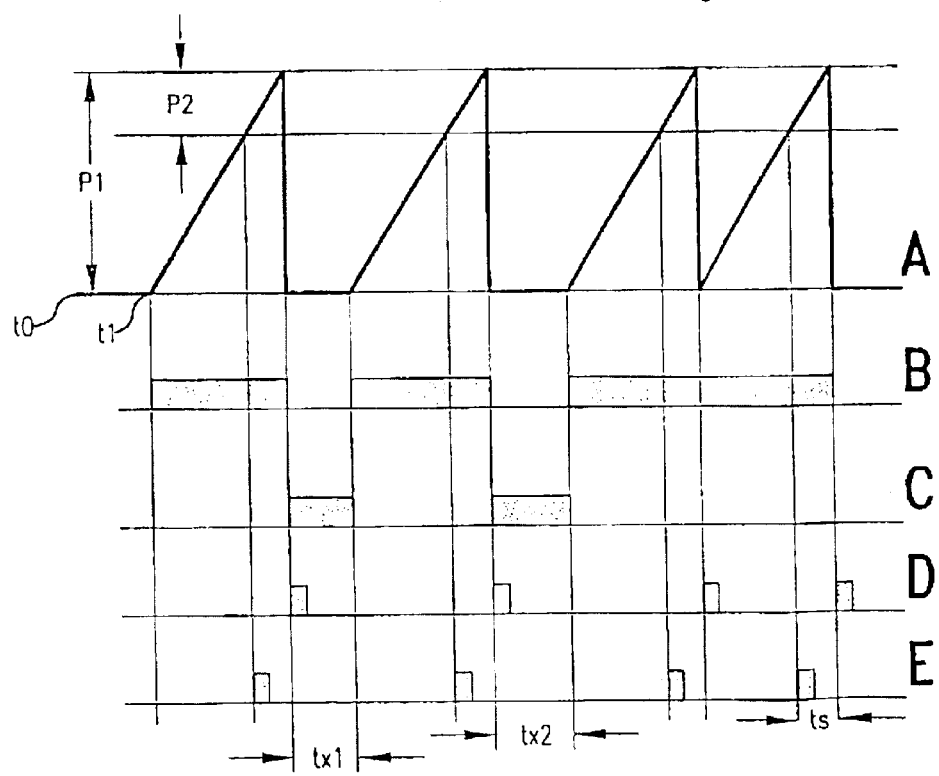
FIG. 5 a switching diagram for the circuit in FIG. 4.

By way of an example, FIG. 5 shows a switching diagram as it is implemented by the central processing unit. The horizontal axis always shows the progress of time. Line A on FIG. 5 vertically shows the length of the sod as it is detected by the sensor 80. At the moment t0, the device is activated and harvesting is commenced. At moment t1, the first sod arrives at the sensor 80 so that this is raised and releases the switch 90. This is the signal for the central processing unit 100 to start a length measurement based on the pulses that are provided by the pulse generator 82 of the sensor. In order to reach a sod length P1, upon reaching a length P1–P2, a signal pulse is given by the processing unit 100 to the electrical clutch 45 in order to release the chopping knife 22. In this respect, P2 is the lateral distance between the sensor 80 and the chopping knife 22. This chopping signal to the clutch 45 is shown on line B in FIG. 5. In the meantime, the slide resistor 95 constantly monitors the thickness of the sod 3.

After the chopping signal has been given, the sensor continues to count for a period (ts) until the actual length (P1) has been reached, after which a reset pulse (see figure D) is given to reset the length measurement to zero. Then the next measurement starts for the next sod, at least when a sod is detected underneath the sensor. As long as this is not the case, which can be seen from the position of the switch 90 that is schematically shown on line C of FIG. 5, the length measurement for the next sod will be postponed. Line B in FIG. 5 schematically shows the presence of the sod. Thus by unlinking the starting of new counting from the chopping signal, measurement only takes place if a sod is actually present and the system is able to cope with interruptions between successive sod s. In the figure, this is the case during the periods tx1 and tx2.

Thus the invention provides a sod harvesting device that controls the harvesting virtually completely automatically and can thus be operated in practice by only one operator. All of the sensors used for this are housed in a compact unit that can be easily installed as a finished factory product or at a later date on an existing device. The central processing unit with its operating means is for example housed in the cabin of the device.

Whilst the invention for this has only been explained in more detail purely based on an example of an embodiment, it will be evident that the invention is in no way restricted to this. On the contrary, many variants and representations of the invention are possible for an average tradesman.

What is claimed is:

1. Sod harvesting device, comprising a mobile chassis with a first knife (21) that is capable of cutting a sod (3) free from a field and a second knife (22) that is capable of cutting off the sod in a direction that is transverse to the direction of travel, whereby the second knife is equipped with actuation means (42, 44, 45) which cause the second knife to work into the sod when a desired sod length has been reached and where transport means (6) are present near the first knife to receive the cut away sod and to carry it away, wherein an electronic sensor (81, 82) is installed near a conveyor track (6) for the sod, which is capable of recording at least a measure for a length of passing cut away sod and of producing this as an electronic signal and in that then sensor is linked by electric means to the actuation means for the second knife in order to release the second knife upon reaching a predetermined sod length, and wherein the conveyer track includes a means for detecting the presence or absence of the sod in the conveyer track.

2. Device according to claim 1 wherein the sensor is linked to the actuation means (42, 44, 45) via a central processing unit (100).

3. Device according to claim 2 wherein the electronic sensor contains a measuring wheel (81) to rest on and to be driven by a passing sod, and that a sensor (82) linked to the measuring wheel records a rotation of the measuring wheel and produces an electronic signal.

4. Device according to claim 4 wherein the sensor (82) is capable of recording a rotation direction of the measuring wheel (81).

5. Device according to claim 3 wherein the sensor includes an incremental pulse generator.

6. Device according to claim 1 wherein electronic detection means (90) are applied to record the presence of a sod in the conveyor track (6) and to produce this as an electronic signal.

7. Device according to claim 6 wherein the sensor is freely suspended in a direction essentially transverse to the conveyor track for the sod in order to be raised from a point of departure when a sod passes, and in that the detection means are linked to a suspension of the sensor.

8. Device according to claim 7 wherein the means of detection comprises an electronic switch (90) that is capable of cooperating with the suspension of the sensor (80), at least on leaving its point of departure.

9. Device according to claim 1 wherein means (95, 96) are installed next to a conveyor track for the sod in order to determine the thickness of the sod and to produce this as an electronic value.

10. Device according to claim 9 wherein the sensor is freely suspended in a direction transverse to the conveyor track and in that the means for determining the thickness of the sod comprise a raise detector that is capable of recording an amount of raising of the sensor and producing this as an electronic value.

11. Device according to claim 9 wherein the raise detector contains a slide resistor that is linked to the sensor.

12. Device according to claim 1 wherein the first knife (21) is adjustable and is equipped with adjustment means (23, 24, 25) that can be controlled by a central processing unit (100).

13. Device according to claim 12 wherein the means of adjustment contains an electronically controlled actuator (25) connected to the first knife.

14. Device according to claim 1 wherein the electronically controlled mechanisms for the second knife (22) contain an electronic clutch (45) that is incorporated in a transmission between a drive (44) for the chassis and a cam disc (42) on which the second knife rests under spring (41) pressure.

* * * * *